United States Patent [19]
Blackwell et al.

[11] Patent Number: 4,965,641
[45] Date of Patent: Oct. 23, 1990

[54] PROCESSOR MODEM

[75] Inventors: Steven R. Blackwell, Huntsville, Ala.; Steve Polge, Raleigh, N.C.; Danny Windham, Madison; Melvin Bruce, Huntsville, both of Ala.

[73] Assignee: Motorola, Inc., Schaumburg, Ill.

[21] Appl. No.: 353,286

[22] Filed: May 17, 1989

Related U.S. Application Data

[63] Continuation-in-part of Ser. No. 314,671, Feb. 21, 1989.

[51] Int. Cl.$^5$ .............................................. H04B 1/38
[52] U.S. Cl. ......................................... 375/7; 379/98
[58] Field of Search ................... 375/7, 8; 379/93, 94, 379/96, 97, 98; 364/708, 709, 710; 371/32, 49

[56] References Cited

U.S. PATENT DOCUMENTS

| | | | |
|---|---|---|---|
| 4,085,449 | 4/1978 | Walsh et al. | 375/8 |
| 4,455,661 | 6/1984 | Qureshi | 375/8 |
| 4,518,823 | 5/1985 | Kessler | 375/8 |
| 4,646,320 | 2/1987 | Krishnan | 375/8 |
| 4,680,773 | 7/1987 | Amundson | 375/8 |
| 4,700,358 | 10/1987 | Duncanson et al. | 375/8 |

OTHER PUBLICATIONS

Gilhousen "A Multi-Stack Micro Processor for Satellite Modem", Natl. Telcom. Conf. San Diego, CA 1974.

Primary Examiner—Douglas W. Olms
Assistant Examiner—Stephen Chin
Attorney, Agent, or Firm—Wayne J. Egan

[57] ABSTRACT

An improved data terminal equipment (DTE)-modem arrangement is disclosed. In this arrangement, a single processor, such as one that resides within a DTE, both executes an application program and implements a modem. A DTE that utilizes this arrangement, therefore, needs only a single processor to perform both the application and modem functions.

18 Claims, 4 Drawing Sheets

TRANSMIT WORD

TRANSMIT BAUD

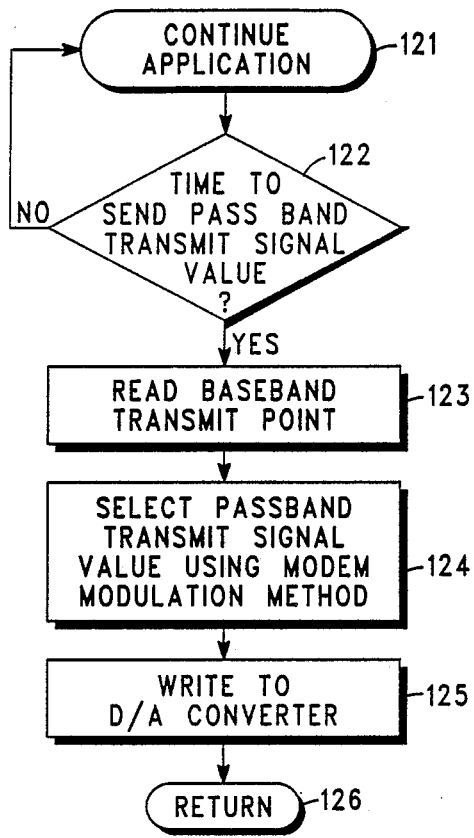
TRANSMIT SAMPLE
FIG.3C
RECEIVE SAMPLE
FIG.4A
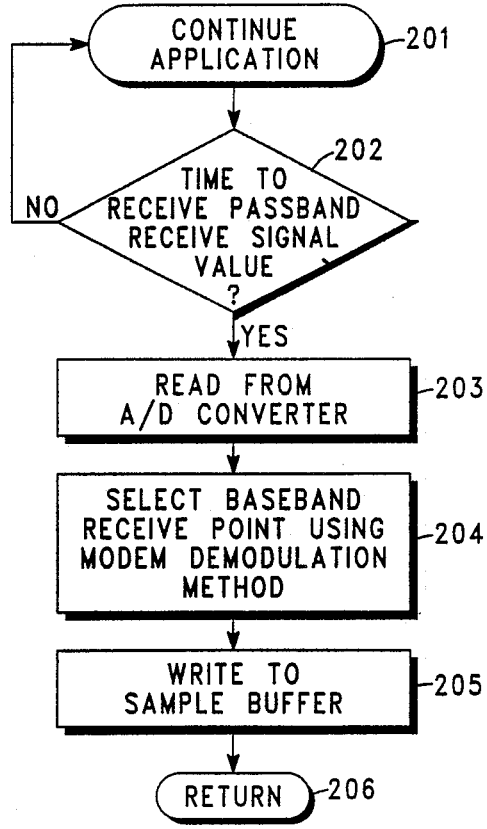

RECEIVE BAUD

RECEIVE WORD

PROCESSOR MODEM

CROSS-REFERENCE TO RELATED APPLICATION

This is a continuation-in-part of a prior application Ser. No. 07/314,671, filed on Feb. 21, 1989, entitled "Personal Computer Modem", by the identical applicants of the present application, and assigned to the same assignee of the present invention, which prior application is now abandoned.

TECHNICAL FIELD

This application relates to data terminal equipment (DTE) in general and more particularly to any processor having an application program and arranged to communicate with an external point via a modem coupled to a transmission facility such as a telephone line.

BACKGROUND OF THE INVENTION

Programmable processor-controlled data terminal equipment (DTE) such as work stations, data terminals, and personal computers are increasingly common in today's society.

It is known to program such a DTE to perform a desired function or application such as, for example, word processing or data terminal emulation. This is accomplished by programming the DTE's processor with a suitable application program that has been customized for the desired function.

It is also known to program such a DTE to communicate with another remote DTE or other source. This is accomplished by coupling the DTE's processor to a data communications equipment (DCE) or modem via a suitable DTE-DCE interface such as an RS-232 type. The modem, in turn, is coupled to a telephone line or other transmission facility. The processor may then be programmed to exchange information with the modem which, in turn, converts the information into signals suitable for transmission to the remote source via the telephone line.

A wide variety of modems are available to support such DTE-modem arrangements. In the prior art, these modems have either been stand-alone units external to the DTE or else customized plug-in units that are mounted internal to the DTE.

The problem with this DTE-modem arrangement is it is processor-redundant. This is because the modem itself typically contains at least one onboard processor to implement various modem functions such as modulation, demodulation, interfacing with the DTE, and other control functions. As a result, the total cost of the DTE-modem arrangement includes the cost of both the DTE's processor as well as the modem's processor. In the long run, this arrangement is inefficient, since it forces the DTE-modem user ultimately to pay for two (or more) processors when, with appropriate software and hardware, the single processor of the DTE could perform the same function.

Therefore, it would be desirable to provide an improved DTE-modem arrangement. Further, it would be particularly desirable to arrange the DTE processor to both execute an application program and implement a modem, thereby eliminating the need for the stand-alone modem.

SUMMARY OF THE INVENTION

It is an object of the present invention to provide an improved DTE-modem arrangement. Accordingly, a processor modem arrangement is described whereby a single processor, such as one that resides within a DTE, both executes an application program and implements a modem.

A DTE utilizing this arrangement, therefore, needs only a single processor to perform both the modem and the application program functions. This is an advantage over the prior art, since a prior DTE would utilize at least two processors to perform these functions.

BRIEF DESCRIPTION OF THE DRAWINGS

FIGS. 3A–3C and 4A–4C show exemplary flow diagrams for the processor modem, according to the invention, as follows:
FIG. 3A shows a transmit word routine;
FIG. 3B shows a transmit baud routine;
FIG. 3C shows a transmit sample routine;
FIG. 4A shows a receive sample routine;
FIG. 4B shows a receive baud routine;
FIG. 4C shows a receive word routine.

DETAILED DESCRIPTION OF THE INVENTION

Figure 1:
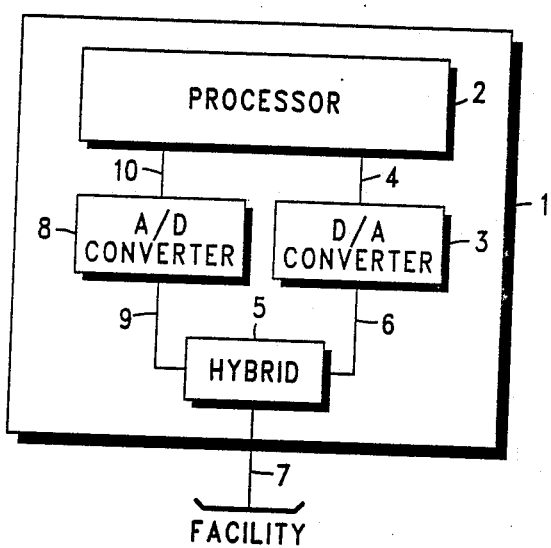
FIG. 1 is a block diagram that shows a DTE such as a personal computer, data terminal, or work station arranged with a first embodiment of the processor modem, according to the invention.

FIG. 1 is a block diagram that shows a DTE such as a personal computer, data terminal, or work station arranged with a first embodiment of the processor modem, according to the invention.

Referring to FIG. 1, there is shown a DTE 1 containing a processor 2. The processor 2, in turn, is arranged to execute an application program and to implement a modem. The arrangement depicted in FIG. 1 transmits information as follows: The processor 2 applies the appropriate input signals to the input of a suitable line output means 3 such as, for example, a digital-to-analog (D/A) converter, via a first link 4. The line output means 3, in turn, applies corresponding output signals to a hybrid 5 via a second link 6. The hybrid 5, in turn, applies corresponding outgoing signals to a suitable facility 7 such as, for example, a two-wire telephone line.

The arrangement depicted in FIG. 1 receives information as follows: The facility 7 applies incoming signals to the hybrid 5 which, in turn, applies input signals to the input of a suitable line input means 8 such as, for example, an analog-to-digital (A/D) converter, via a third link 9. The line input means 8, in turn, applies the corresponding output signals to the processor 2 via a fourth link 10.

In the arrangement of FIG. 1, the DTE 1, processor 2, line output means 3, line input means 8, hybrid 5, links 4, 6, 9, 10, and the facility 7 are all well-known in the art.

Although FIG. 1 depicts a first embodiment of the invention arranged with a two-wire facility 7, it will be appreciated that a four-wire facility (not shown) comprising a two-wire transmit leg and a two-wire receive leg may also be used. In such an arrangement, the transmit leg would terminate directly on the output of the line output means 3, and the receive leg would terminate directly on the input of the line input means 8. Therefore, the second link 6, third link 9, and hybrid 5 would not be used.

Figure 2:
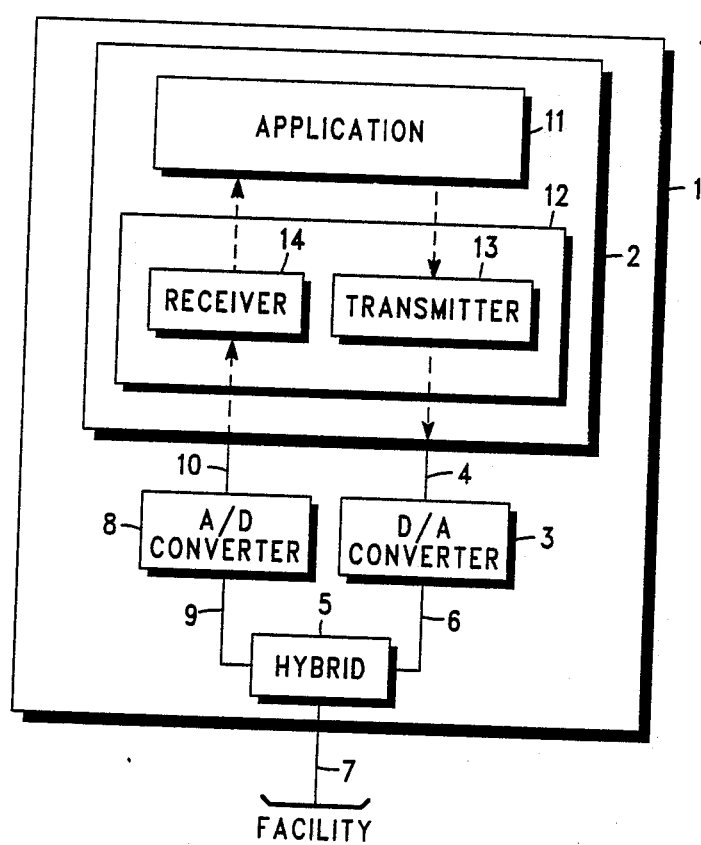
FIG. 2 is a second block diagram that shows the DTE of FIG. 1 arranged with the first embodiment.

Referring now to FIG. 2, there is a second block diagram depicting DTE 1 arranged with the first embodiment of the processor modem. As shown, processor 2 comprises both a user application program 11 and a modem program 12. The modem program 12, in turn, includes both a transmit program 13 and a receive program 14.

Referring still to FIG. 2, the transmit program 13 comprises three routines, as follows: a transmit word routine, a transmit baud routine, and a transmit sample routine, which routines will be shown in the following FIGS. 3A–3C. Similarly, the receive program 14 comprises three routines, as follows: a receive sample routine, a receive baud routine, and a receive word routine, which routines will be shown in the following FIGS. 4A–4C. The term "routine", as used herein, refers to a predetermined sequence of software steps.

Figure 3A:
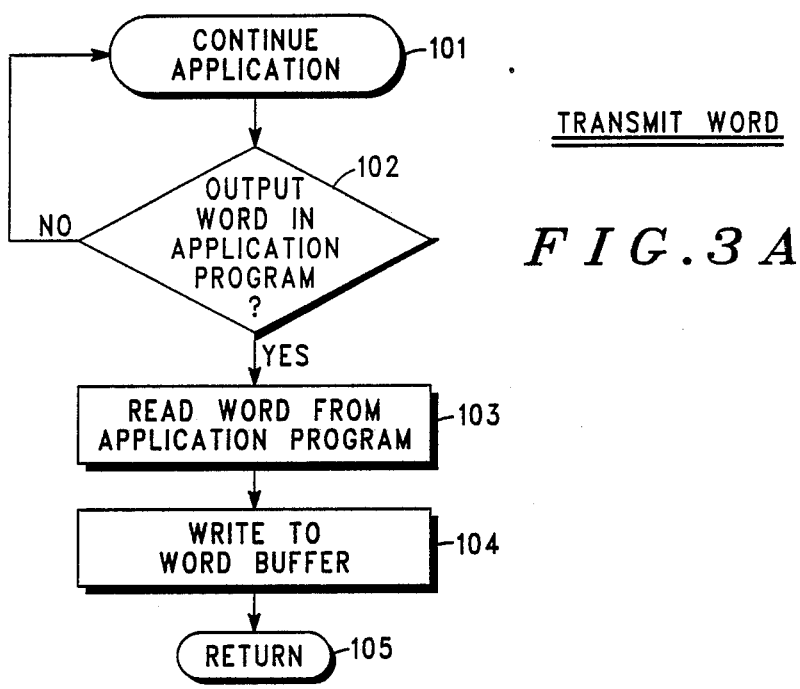

Referring now to FIG. 3A, there is shown an exemplary flow diagram for the transmit program 13 transmit word routine, according to the invention. This routine is designated a word routine because it is driven by a word-generated interrupt.

Referring still to FIG. 3A, the process starts with the processor performing the application program, step 101. At this point, the process determines whether the application program has an output word to transmit, step 102. It will be appreciated that each word typically will consist of an integral number of eight-bit segments, or bytes, such as, for example, one byte (as in an 8-bit word) or two bytes (as in a 16-bit word). If the answer to this determination is negative, the process continues with the application program, step 101. If the answer to this determination is affirmative, however, the process receives an output word from the application program, step 103. This may be accomplished by any convenient receiving method such as, for example, by reading the output word from a suitable predetermined buffer. The process next writes this output data word to a transmit word buffer, step 104. The transmit word routine is now complete, step 105, and the process returns to step 101, where it continues with the application program.

Figure 3B:
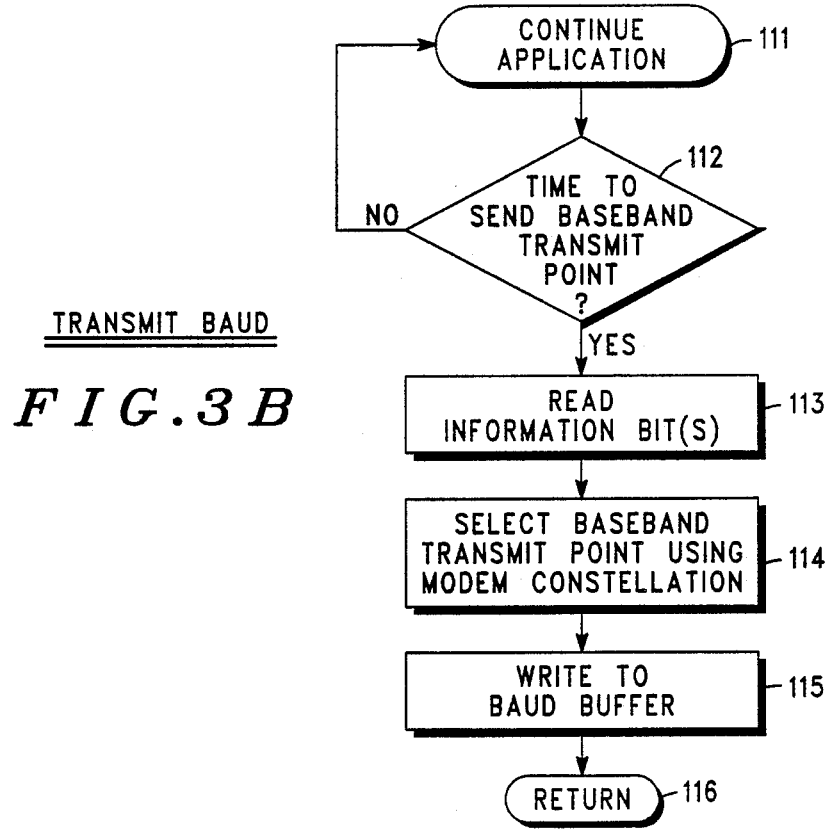

FIG. 3B shows an exemplary flow diagram for a transmit program 13 transmit baud routine, according to the invention. This routine is designated a baud routine because it is driven by a baud-oriented timed interrupt.

Referring now to FIG. 3B, the process starts with the processor performing the application program, step 111. At this point, the process determines whether it is time to send a baseband transmit point, step 112. This is also known in the art as determining when it is time to send a new baud, and the result depends on the type of modem being implemented. For example, if a 300-baud modem such as a Bell 103-type or a Bell 212-type modem is being implemented, a new baud is sent every 1/300 of a second. On the other hand, if a 600-baud modem such as a V.22bis-type modem were being implemented, a new baud would be sent every 1/600 of a second. If the answer to this determination is negative, the process continues with the application program, step 111.

If the answer to this determination is affirmative, however, the process reads at least one information bit from the transmit word buffer, step 113. Here the number of bits read depends on the type of modem being implemented. For example, in a Bell 103-type modem, one information bit is sent with each baud and, therefore, only one bit would be read if this type of modem were being emulated. On the other hand, in a V.22 bis-type modem, two information bits are sent with each baud and, therefore, two bits would be read if this type of modem were being implemented.

The process proceeds to step 114, where it selects a baseband transmit point based on the values of the bits read in the previous step 113. It will be appreciated that the transmit point can be selected from a predetermined look-up table which essentially maps each unique state of information bit values to be sent onto a corresponding unique baseband transmit point. In the art, a graphical display of this collection of baseband transmit points versus information bit values is known as a constellation, or eye pattern. It will be appreciated that, whatever modem type is being implemented, the process can use a suitable predetermined eye pattern or constellation corresponding to the modem type to determine the baseband transmit point corresponding to the predetermined information bits. After selecting a baseband transmit point (step 114), the process writes this transmit point to a transmit baud buffer, step 115. The transmit baud routine is now complete, step 116, and the process returns to step 111, where it continues with the application program.

FIG. 3C shows an exemplary flow diagram for a transmit program 13 transmit sample routine, according to the invention. The routine is designated a sample routine because it is driven by a transmit sample-oriented time interrupt.

Referring now to FIG. 3C, the process starts with the processor performing the application program, step 121. At this point, the process determines whether it is time to send a passband transmit signal value, step 122. This is also known in the art as determining when it is time to send a new Nyquist transmit sample, and the resulting transmit sample rate must be at least twice the transmit baud rate of the modem being implemented. For example, as pointed out earlier, if a 600-baud modem such as a V.22bis-type is being implemented, a new baud would be sent every 1/600 of a second. The Nyquist transmit sampling rate then would be twice this rate, and so a new transmit sample must be sent at least every 1/1200 of a second, or preferably more often. If the answer to this determination is negative, the process continues with the application program, step 121.

If the answer to this determination is affirmative, however, the process reads the baseband transmit point from the transmit baud buffer, step 123. The process next proceeds to step 124, where it selects a passband transmit signal value based on the baseband transmit point read in the previous step 123. This is known in the art as modulating the transmit carrier signal, and the result will depend on the type of modem being implemented. The particular technique utilized may modulate the frequency, phase, or amplitude of the transmit carrier signal. In a Bell 103-type modem, for example, simple frequency keying is used to modulate the carrier. More complex schemes are also known. For example, in a Bell 212-type modem, phase-shifting is used to modulate the carrier signal. Also, in a high-speed synchronous modem such as a V.29-type, phase-and-amplitude shifting is used to modulate the carrier. It will be appreciated that, whatever modulation method is used to modulate the carrier, the process can use a suitable predetermined algorithm corresponding to the modulation method to determine the passband transmit signal value corresponding to the predetermined baseband transmit point. After selecting a passband transmit signal value (step 124), the process provides this signal value to the line output means, step 125. The transmit sample routine is now complete, step 126, and the process returns to step 121, where it continues with the application program.

Referring now to FIG. 4A, there is shown an exemplary flow diagram for a receive program 14 receive sample routine, according to the invention. This routine is designated a sample routine because it is driven by a receive sample-oriented timed interrupt.

Referring still to FIG. 4A, the process starts with the processor performing the application program, step 201. At this point, the process determines whether it is time to receive a passband receive signal value, step 202. This is also known in the art as determining when it is time to receive a new Nyquist receive sample, and the resulting receive sample rate must be at least twice the receive baud rate of the modem being implemented. For example, assuming a 600-baud modem such as a V.22bis-type were being implemented, a new baud would be received every 1/600 of a second. The corresponding Nyquist receive sampling rate would be twice this rate, and so a new receive sample would be received at least every 1/1200 of a second, or preferably more often. If the answer to this determination is negative, the process continues with the application program, step 201.

If the answer to this determination is affirmative, however, the process receives a receive signal value from the line input means, step 203.

The process next proceeds to step 204, where it selects a baseband receive point based on the passband receive signal value received in the previous step 203. This is known in the art as demodulating the receive carrier signal, and the result will depend on the type of modem being implemented. The particular technique utilized may demodulate the frequency, phase, or amplitude of the receive carrier signal. In a Bell 212-type modem, for example, the phase-shift of the receive carrier signal would be detected. Further, in a high-speed synchronous modem such as a V.29-type, for example, the phase- and amplitude-shifts of the receive carrier signal would be detected. It will be appreciated that, whatever demodulation method is employed, the process can use a suitable predetermined algorithm corresponding to the demodulation method to determine the baseband receive point corresponding to the predetermined passband receive signal value. After selecting a baseband receive point (step 204), the process writes this baseband receive point to a receive sample buffer, step 205. The receive sample routine is now complete, step 206, and the process returns to step 201, where it continues with the application program.

Figure 4B:
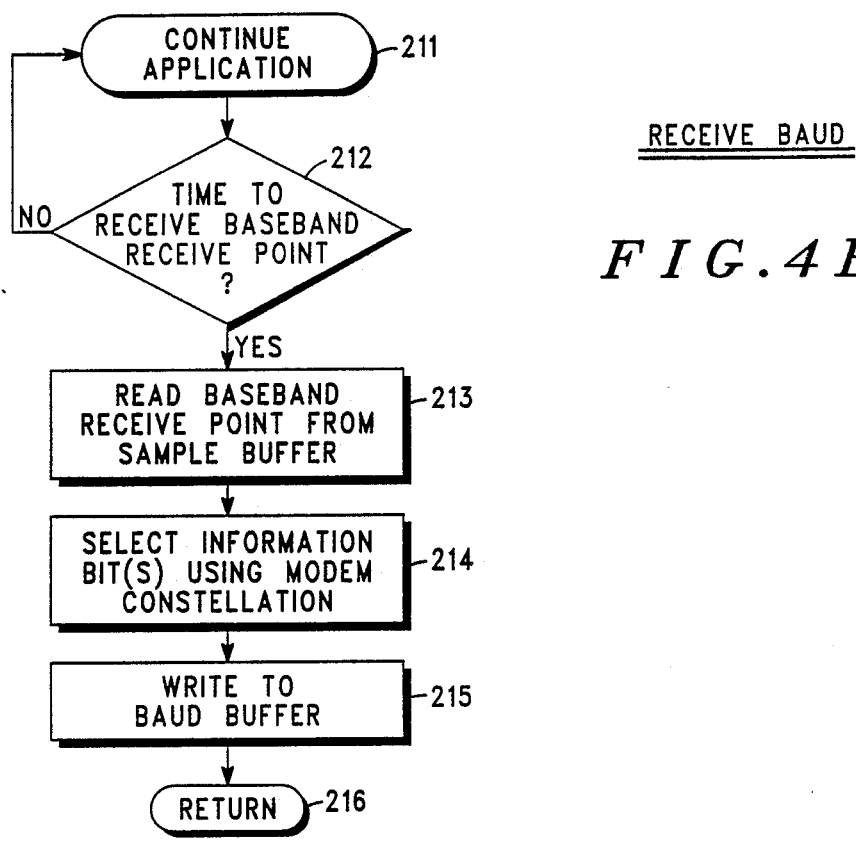

FIG. 4B shows an exemplary flow diagram for a receive program 14 receive baud routine, according to the invention. This routine is designated a baud routine because it is driven by a baud-oriented timed interrupt.

Referring now to FIG. 4B, the process starts with the processor performing the application program, step 211. At this point, the process determines whether it is time to receive a baseband receive point, step 212. This is also known in the art as determining when it is time to receive a new baud, and the result depends on the type of modem being implemented. For example, if a 300-baud modem such as a Bell 103-type or a Bell 212-type modem is being implemented, a new baud is received every 1/300 of a second. On the other hand, if a 600-baud modem such as a V.22bis-type modem were being implemented, a new baud would be received every 1/600 of a second. If the answer to this determination is negative, the process continues with the application program, step 211.

If the answer to this determination is affirmative, however, the process reads the baseband receive point from the receive sample buffer, step 213. The process then goes to step 214, where it selects at least one information bit based on the baseband receive point read from the previous step, step 213. Here the number of bits read depends on the type of modem being implemented. For example, in a Bell 103-type modem, one information bit is received with each baud and, therefore, only one bit would be read if this modem were being implemented. On the other hand, two information bits are received with each baud in a V.22bis-type modem and, therefore, two bits would be read if this type of modem were being implemented. It will be appreciated that the bit values can be selected from a predetermined look-up table which essentially maps each unique baseband receive point onto a corresponding state of information bit values to be received. In the art, a graphical display of this collection of baseband receive points versus information bit values is known as a modem constellation, or eye pattern. It will be appreciated that, whatever modem type is being implemented, the process can use a suitable predetermined eye pattern or constellation corresponding to the modem type to determine the information bits corresponding to the predetermined baseband receive point. After selecting the corresponding received information bit or bits (step 214), the process then writes this information bit or bits to a receive baud buffer, step 215. The receive baud routine is now complete, step 216, and the process returns to step 211, where it continues with the application program.

Figure 4C:
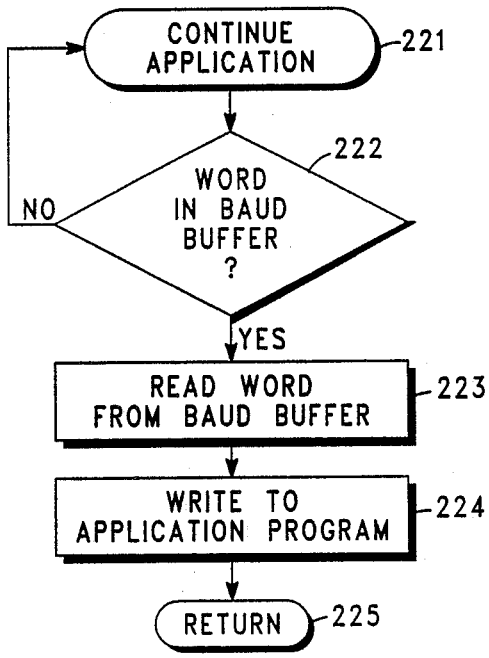

FIG. 4C shows an exemplary flow diagram for a receive program 14 receive word routine, according to the invention. This routine is designated a word routine because it is driven by a word-generated interrupt.

Referring now to FIG. 4C, the process starts with the processor performing the application program, step 221. At this point, the process determines whether the receive baud buffer contains an input word, step 222. As discussed above, each word typically will consist of an integral number of 8-bit increments, or bytes. If the answer to this determination is negative, the process continues with the application program, step 221. If the answer to this determination is affirmative, however, the process reads an input word from the receive baud buffer, step 223. The process next provides this input word to the application program, step 224. This may be accomplished by any convenient providing method such as, for example, by writing the input word to a suitable predetermined buffer. The receive word routine is now complete, step 225, and the process returns to step 221, where it continues with the application program.

While various embodiments of a processor modem, according to the present invention, have been described hereinabove, the scope of the invention is defined by the following claims.

What is claimed is:

1. A method for a processor having an application program and a modem program for receiving output data words from said application program and providing passband transmit signal values, said method comprising the following steps:
   (a) determining when said application program has an output data word;
   (b) receiving said output data word;
   (c) writing said output data byte to a word buffer;
   (d) determining when it is time to send a baseband transmit point;
   (e) reading at least one information bit from said byte buffer;
   (f) selecting a baseband transmit point based at least in part on said at least one information bit and a predetermined method for selecting a baseband transmit point based on at least one predetermined information bit;
   (g) writing said baseband transmit point to a baud buffer;
   (h) determining when it is time to send a passband transmit signal value;
   (i) reading said baseband transmit point from said baud buffer;
   (j) selecting a passband transmit signal value based at least in part on said baseband transmit point and a predetermined method for selecting a passband transmit signal value based on a predetermined baseband transmit point;
   (k) providing said passband transmit signal value.

2. The method of claim 1 wherein said predetermined method for selecting a baseband transmit point based on at least one predetermined information bit is based at least in part on a predetermined modem constellation or eye pattern.

3. The method of claim 2 wherein said predetermined method for selecting a passband transmit signal value based on a predetermined baseband transmit point is based at least in part on a predetermined modem modulation method.

4. The method of claim 3 wherein step (k) includes providing said passband transmit signal value to line output means coupled to said processor.

5. The modem transmit method of claim 4 wherein said line output means comprises a D/A converter device and said passband transmit signal value comprises a digital sample value.

6. A method for a processor having an application program and a modem program for receiving passband receive signal values and providing input data words to said application program, said method comprising the following steps:
   (a) determining when it is time to receive a passband receive signal value;
   (b) receiving a passband receive signal value;
   (c) selecting a baseband receive point based at least in part on said passband receive signal value and a predetermined method for selecting a baseband receive point based on a predetermined passband receive signal value;
   (d) writing said baseband receive point to a sample buffer;
   (e) determining when it is time to receive a baseband receive point;
   (f) reading said baseband receive point from said sample buffer;
   (g) selecting at least one information bit based at least in part on said baseband receive point and a predetermined method for selecting at least one information bit based on a predetermined baseband receive point;
   (h) writing said at least one information bit to a baud buffer;
   (i) determining when said baud buffer has an input data word;
   (j) reading said input data word from said baud buffer;
   (k) providing said input data word to said application program.

7. The method of claim 6 wherein said predetermined method for selecting a baseband receive point based on a predetermined passband receive signal value is based at least in part on a predetermined modem demodulation method.

8. The method of claim 7 wherein said predetermined method for selecting at least one information bit based on a predetermined baseband receive point is based at least in part on a predetermined modem constellation or eye pattern.

9. The method of claim 8 wherein said step (b) includes receiving said passband receive signal value from line input means coupled to said processor.

10. The modem receive method of claim 9 wherein said line input means comprises an A/D converter device and said passband receive signal value comprises a digital sample value.

11. A data terminal equipment (DTE) having a processor and line output means, said line output means coupled to said processor, said processor having an application program and modem program means for receiving output data words from said application program and providing passband transmit signal values to said line output means, said modem program means comprising:
   first determining means for determining when said application program has an output data word;
   receiving means responsive to said first determining means for receiving said output data word;
   first writing means responsive to said receiving means for writing said output data word to a word buffer;
   second determining means for determining when it is time to send a baseband transmit point;
   first reading means responsive to said second determining means for reading at least one information bit from said byte buffer;
   first selecting means responsive to said first reading means for selecting a baseband transmit point based at least in part on said at least one information bit and a predetermined method for selecting a baseband transmit point based on at least one predetermined information bit;
   second writing means responsive to said first selecting means for writing said baseband transmit point to a baud buffer;
   third determining means for determining when it is time to send a passband transmit signal value;
   second reading means responsive to said third determining means for reading said baseband transmit point from said baud buffer;
   second selecting means responsive to said second reading means for selecting a passband transmit signal value based at least in part on said baseband transmit point and a predetermined method for selecting a passband transmit signal value based on a predetermined baseband transmit point;

providing means responsive to said second selecting means for providing said passband transmit signal value to said line output means.

12. The DTE of claim 11 wherein said predetermined method for selecting a baseband transmit point based on at least one predetermined information bit is based at least in part on a predetermined modem constellation or eye pattern.

13. The DTE of claim 12 wherein said predetermined method for selecting a passband transmit signal value based on a predetermined baseband transmit point is based at least in part on a predetermined modem modulation method.

14. The DTE of claim 13 wherein said line output means comprises a D/A converter and said passband transmit signal value comprises a digital sample value.

15. A data terminal equipment (DTE) having a processor and line input means, said line input means coupled to said processor, said processor having an application program and modem program means for receiving passband receive signal values from said line input means and providing input data words to said application program, said modem program means comprising:

first determining means for determining when it is time to receive a passband receive signal value;

receiving means responsive to said first determining means for receiving a passband receive signal value from said line input means;

first selecting means responsive to said receiving means for selecting a baseband receive point based at least in part on said passband receive signal value and a predetermined method for selecting a baseband receive point based on a predetermined passband receive signal value;

first writing means responsive to said first selecting means for writing said baseband receive point to a sample buffer;

second determining means for determining when it is time to receive a baseband receive point;

first reading means responsive to said second determining means for reading said baseband receive point from said sample buffer;

second selecting means responsive to said first reading means for selecting at least one information bit based at least in part on said baseband receive point and a predetermined method for selecting at least one information bit based on a predetermined baseband receive point;

second writing means responsive to said second selecting means for writing said at least one information bit to a baud buffer;

third determining means for determining when said baud buffer has an input data word;

second reading means responsive to said third determining means for reading said input data word from said baud buffer;

providing means responsive to said second reading means for providing said input data word to said application program.

16. The DTE of claim 15 wherein said predetermined method for selecting a baseband receive point based on a predetermined passband receive signal value is based at least in part on a predetermined modem demodulation method.

17. The DTE of claim 16 wherein said predetermined method for selecting at least one information bit based on a predetermined baseband receive point is based at least in part on a predetermined modem constellation or eye pattern.

18. The DTE of claim 17 wherein said line input means comprises an A/D converter and said passband receive signal value comprises a digital sample value.

* * * * *